No. 688,319. Patented Dec. 10, 1901.
P. W. LITCHFIELD & F. R. CHAMBERLAIN.
RUBBER TIRE.
(Application filed Jan. 5, 1900.)
(No Model.)
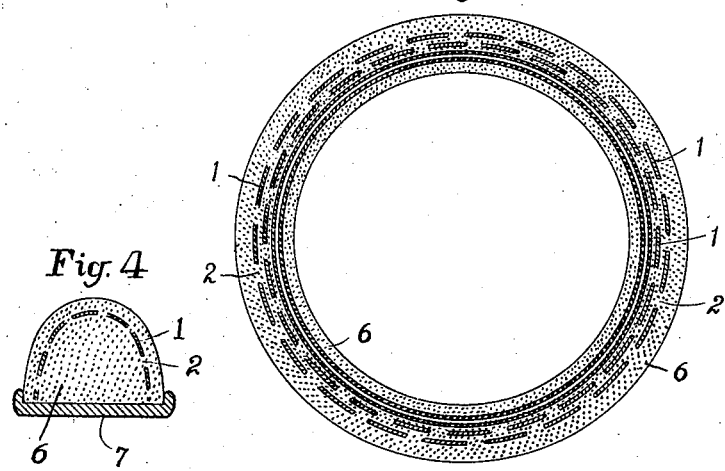
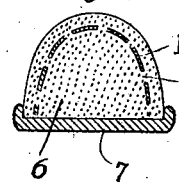
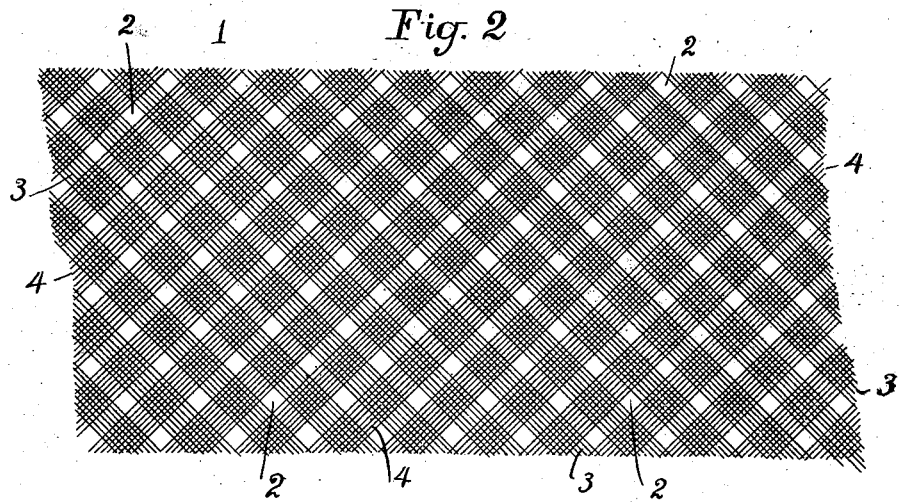
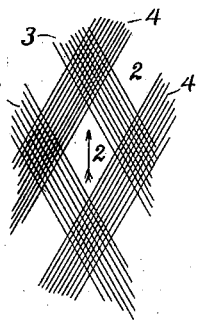
Witnesses;
Inventors,
Paul W. Litchfield,
Frank R. Chamberlain,

UNITED STATES PATENT OFFICE.

PAUL W. LITCHFIELD AND FRANK R. CHAMBERLAIN, OF CHELSEA, MASSACHUSETTS.

RUBBER TIRE.

SPECIFICATION forming part of Letters Patent No. 688,319, dated December 10, 1901.

Application filed January 5, 1900. Serial No. 412. (No model.)

*To all whom it may concern:*

Be it known that we, PAUL W. LITCHFIELD and FRANK R. CHAMBERLAIN, citizens of the United States, residing at Chelsea, in the county of Suffolk and State of Massachusetts, (post-office address 19 Winnisimmet street, in said city,) have invented a new and useful Rubber Tire, of which the following is a full, clear, and exact description.

A great difficulty met with in rubber tires, and especially in pneumatic tires, is the liability of the separation from the rubber of the fabric used therewith. When this occurs, the tire must be removed, sent back to the makers, and the parts revulcanized together. This occasions much loss of time, considerable expense, and, in addition, a rapid deterioration of the tire, owing to the fact that each vulcanization injures the rubber and lessens the life thereof. To remedy this defect and also to construct a tire embodying certain other advantages is the object of this invention, which consists, essentially, in providing a perforated fabric for the tire.

Referring to the drawings forming part of this specification, Figure 1 is a cross-section of a pneumatic tire embodying our invention. Fig. 2 is a face view of a section of our perforated fabric. Fig. 3 is a diagram illustrating a section of our fabric when subjected to tensile strain, and Fig. 4 is a cross-section of a solid-rubber tire.

As shown in Fig. 2, the perforations 2 in our fabric 1 are preferably rectangular in outline and extend in rows crossing each other at right angles. The warp and weft threads 3 and 4 lie parallel with the two sets of rows of said perforations and are hence unbroken throughout their length. These perforations may be formed in the fabric by punching them in an unbroken sheet of duck; but this is objectionable on account of the expense involved in the operation, but more on account of the extreme difficulty of punching all the perforations along exactly the same warp and weft threads, and even a slight infringment upon the threads 3 and 4 severs more or less thereof, and thereby greatly weakens the fabric, depriving it of the strength required for the tire. Our preferable method of producing the perforations is by weaving the fabric in such a form originally. This insures the continuity of every thread and the consequent full strength thereof, lightens the fabric by the consequent absence of more than a single series of threads at each side of each perforation, and is far more economical than the method of punching. This perforated fabric is preferably woven in sheets and then coated with rubber, the latter being made to wholly fill all the perforations thereof. This makes an unbroken sheet, which is cut into strips of the requisite dimensions for use in the formation of the tire, the warp and weft threads running diagonally across the strips. In other words, the strips are cut upon the bias in the customary way. The tire is built up with rubber 6 and plies of this fabric in the usual manner; but it will be observed, as indicated in Fig. 2, that after the tire has been formed and vulcanized the rubber extends in unbroken connections through the perforations, uniting the rubber which is located at the opposite faces of the fabric. Since the film of rubber in the perforations coalesces with the rubber applied to the tire, becoming after vulcanization absolutely integral therewith, the said rubber in the perforations become, in effect, what might be termed "rivets," inseparably joining the whole tire together. In fact, a tire thus made cannot be pulled apart layer from layer. We have even found it impossible to separate the plies of this fabric from each other when experimenting with a narrow annulus of one of our tires. If desired, all the fabric in a tire may be of this perforated kind or only the outer layers thereof, the inner ones being of the ordinary duck. In addition to this great advantage of rendering a tire absolutely cohesive and incapable of having its cover or outer layer pull off or of working off from the rim our tire is made remarkably resilient. The reason for this is that the rubber located in each perforation forms an elastic cushion to resist lateral distortion. When, therefore, the tire is made to slightly expand, the fabric is stretched thereby and the warp and weft threads drawn out of perpendicular with each other—that is to say, the perforations 2 are each made to assume a rhomboid form, thus elongating the rubber therein in one direction and compressing it in another. When the distorting strain is removed, the rubber immediately recovers its rectangular shape, and thereby restores the fabric to its normal condition. This distortion of the fabric-threads is illustrated in Fig. 3, where the arrow indicates the direction of the expansional strain and the consequent elongation of the diagonal parallel therewith. Although we have described the tensional strain upon the fabric as being resisted by said rubber cushions when said perforations extend parallel with the threads composing the fabric, yet we have found that the same result is produced even when the holes are punched irrespective of the warp and weft threads. The reason for this we find to be that when the fabric is coated with rubber before being cut into strips suitable for application upon a tire all the warp and weft threads thereof are cemented together, each thread to its neighbor, and consequently when a series of perforations are punched through the fabric without any attention to locating such perforations exactly parallel with certain threads that those threads which are thereby severed, and consequently do not extend unbroken the entire width of the fabric, do not pull out from the fabric or in any way weaken the same. Hence we find the fabric to be equally capable of resisting strain and elastically recovering therefrom when the holes are punched through the fabric as when woven therein and so insured to be parallel with the threads. We further find the cushioning effect of the rubber rivets in the perforations to be equally perfect when the perforations are of other contours than the square shape shown.

While Fig. 1 shows our fabric utilized in the construction of a pneumatic tire, Fig. 4 shows the fabric as applied to a solid-rubber tire, 6 indicating the rubber, and 7 the wheel-rim.

What we claim as our invention, and for which we desire Letters Patent, is as follows, to wit:

1. A tire composed of rubber and fabric, said fabric being tightly woven but having rows of perforations therein extending parallel to the warp and weft threads thereof, whereby not only are the plies of fabric securely bound together by the bodies of rubber extending through said perforations, but said bodies of rubber serve as cushions to elastically resist tensional strain on said fabric in directions oblique to the threads thereof, substantially as set forth.

2. A tire composed of rubber and fabric, said fabric having its warp and weft threads separated into sets, such sets being separated one from the other and thereby caused to form the rectangular blank spaces or perforations extending in rows parallel with said threads, substantially as set forth.

In testimony that we claim the foregoing invention we have hereunto set our hands this 1st day of January, 1900.

PAUL W. LITCHFIELD.
FRANK R. CHAMBERLAIN.

Witnesses:
A. B. UPHAM,
GUY H. HOLLIDAY.